April 6, 1954
C. PETTAS
2,674,574
FILTER MEANS FOR AQUARIUMS
Filed April 22, 1952
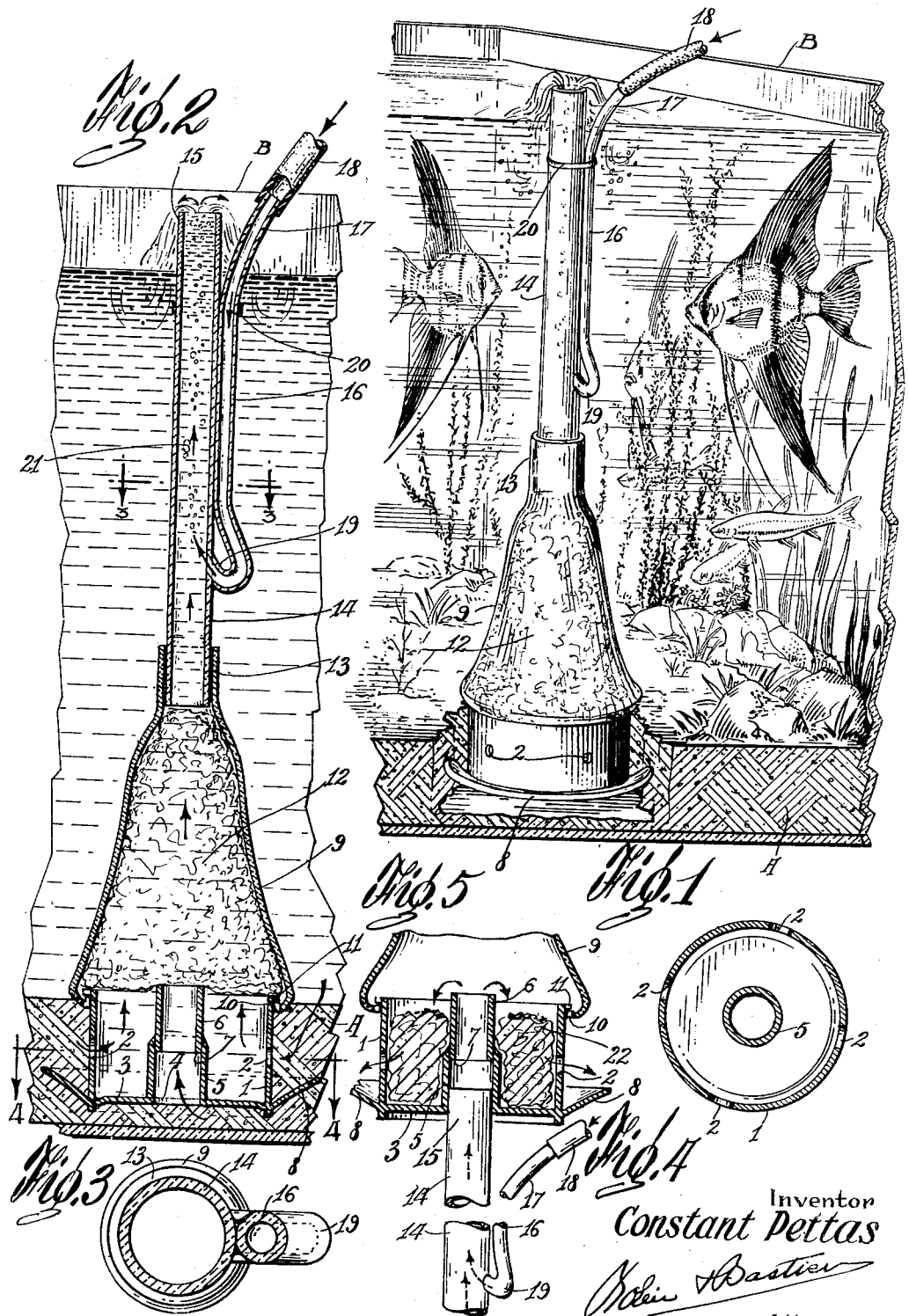
Inventor
Constant Pettas Patented Apr. 6, 1954

2,674,574

UNITED STATES PATENT OFFICE 2,674,574

FILTER MEANS FOR AQUARIUMS

Constant Pettas, Montreal, Quebec, Canada

Application April 22, 1952, Serial No. 283,631

4 Claims. (Cl. 210—16)

The present invention relates to filter and aerating means, and more particularly, such means especially adapted for cleaning and aerating the water of aquariums containing exotic fish and the like marine life.

In aquariums containing vegetable and animal life, the by-products of said life are accumulated gradually at the bottom, and, eventually will cause cloudiness of the water, foul odors and other difficulties, and, in extreme cases, may even endanger the lives of the fish living in said aquariums. As it is not considered good practice among fish fanciers to change the water of their aquariums often, the generally used practice is to clean or filter the water to remove therefrom the vegetable and animal residues, this cleaning being effected by syphoning the bottom of the aquariums or circulating the water therein into some form of outside filtering means wherein the suspended residue of the water is caught.

Such filters have been known for some time and used for the purpose above noted, the filters in question operating by circulating the water through charcoal, sand or other filtering elements; such filters clog rapidly, are too large to be disposed within an aquarium and require, in most instances, elaborate pumping and circulating means for drawing foul water from the aquarium and returning clean water thereto.

The present invention has been conceived to avoid the disadvantages noted above by providing a simple, efficient and practical filter which can be conveniently operated by the means usually available to fish fanciers namely, a stream of air under slight pressure which is used commonly for aerating aquariums through a porous stone.

According to the present invention a combination filter and aerator is provided in one single device which may conveniently be placed in a corner of the aquarium for the purpose of filtering and aerating the water therein.

The main object of the invention, therefore, may be stated to reside in the provision of a combination device for use in aquariums, such device being of improved character and of increased efficiency.

Another object of the invention is the provision of a filter in which a filtering element can be quickly replaced and which filter operates with a simple air stream.

A further object of the invention contemplates a filter and aerator of the character described, which aerator and filter are of simple character, fool-proof and silent so as not to disturb the fish in the quarium in which the aerator is disposed.

Finally, another object of the invention envisages a filter and aerator having the characteristics enumerated above, which filter is versatile and perfectly adapted for cleaning the surface of a sand bed in which it is disposed and the inside portion of said bed which is immediately adjacent the filter, and to serve also as a syphon for picking debris from the bottom of an aquarium and generally removing the dirt thereon.

With this in mind, the present invention comprises an aquarium aerator and filter which includes means whereby water is drawn into a fluid inlet chamber and through a filter chamber through the action of a slight stream of air under pressure.

More specifically, a preferred construction of an aquarium filter in accordance with the present invention includes in combination a filter chamber having aligned top and bottom openings with a packing of filter material disposed within the chamber between the top and bottom openings. A fluid inlet chamber having an open top portion connected directly to the filter chamber bottom opening and a closed bottom portion having a central extension of tubular formation is provided, with the tubular extension being disposed so as to project upwardly from the bottom portion through the fluid inlet chamber to terminate within the lower portion of the filter chamber adjacent the filter packing. This arrangement provides a fluid passage from the exterior of the fluid inlet chamber to the interior of the filter chamber. The fluid inlet chamber is constructed so as to have side walls extending upwardly from the bottom portion in spaced-apart relationship from the central tubular extension and spaced-apart openings are provided in the side walls so as to constitute fluid passages to the interior of the fluid inlet chamber. A straight elongated main tube is connected to the top opening of the filter chamber, with the other end of the tube being opened for the discharge of aerated fluid, and an air pressure tube is connected into the main tube adjacent the end in connection with the filter chamber so as to provide a means of forcing air through the main tube, causing suction of the water to be filtered through the fluid inlet chamber and the filter chamber.

Other objects and advantages of the invention will become apparent or be particularly pointed out, during the description to follow and by referring to the drawings in which:

Figure 1 is a perspective view of the device according to the invention in working position in an aquarium;

Figure 2 is a sectional elevation of the device;

Figure 3 is a cross-section along line 3—3 of Figure 2;

Figure 4 is a cross-section along line 4—4 of Figure 2; and

Figure 5 is a fractional longitudinal section showing another way of mounting the device for picking debris from the bottom of the aquarium.

Referring now more particularly to the drawings in which like reference characters indicate like elements throughout, the device, according to the invention comprises a circular fluid inlet chamber or base 1 having side apertures 2 and closed at its lower end by a bottom wall 3 which has a central opening 4 communicating with a central extension 5 of tubular formation coaxial with and extending upwardly from the bottom wall 3. A second tubular extension 6 of smaller diameter, is inserted into and secured to the top end of the lower extension 5 thus forming a shoulder 7. An upwardly inclined outer flange 8 depends from the bottom edge of the chamber 1 to serve as an anchor member for firmly securing the device of the invention into the sand bed A of the aquarium B.

A bell shaped filter chamber 9 is attached at its lower larger end to the upper edge of the fluid inlet chamber 1 by having its inwardly curved edge 10 engaging a rim 11 depending from the upper marginal edge of the chamber 1. The filter chamber 9 is preferably made of a transparent plastic and is filled with a filtering packing medium 12 such as glass wool. The upper smaller end of the bell shaped filter chamber 9 forms a socket 13 receiving with a snug fit a main tube 14.

A side air supply tube 16 has an outwardly curved upper end 17 adapted to be connected to a flexible tubing 18 for supplying compressed air, extends alongside a portion of the tube 14 and is curved upwardly at its lower end 19 just before opening into the main tube 14. A collar 20 secures the air supplying side tube 16 to the main tube 14.

The device is preferably vertically disposed in the aquarium with the fluid inlet chamber 1 embedded into the sand A as shown in Figure 2 and with the upper end 15 of the main tube 14 projecting above the water surface. Compressed air, preferably supplied by a diaphragm air compressor such as commonly used for aquariums, is admitted into the column of water inside the main tube 14 through tubing 18 and the side tube 16. Air bulbs 21 are formed and rise within the main tube 14. Thus the air and water mixture within the top part of a main tube 14 has a smaller density than the water in the aquarium whereby an upward water flow is created within the device. Debris loaded water enters the side apertures 2 and the tubular extensions 5 and 6 of the fluid inlet chamber 1, passes through the filtering medium 12 in the filter chamber 9 and the filtered water is aerated and discharged at the upper end 15 of the main tube 14.

It will be noted that the sand bed area lying close to the device of the invention will be cleaned by the water flow entering the side apertures 2, of the fluid inlet chamber 1, while the sand bed area lying further away from the device will be cleaned by the water flow entering through the bottom aperture 4 of the fluid inlet chamber 1 into the tubular extensions 5 and 6 and directly through the filter packing 12 in the filter chamber 9.

The device may also be used for removing debris suspended in the water of the aquarium freely resting on the sand bed A. For this purpose the arrangement shown in Figure 5 is used. The upper end 15 of the main tube 14 is inserted within the tubular extension 5 of the fluid inlet chamber 1 and the latter is filled with glass wool 22. The device, when so arranged, is held in one hand and the lower end of the main tube 14 is brought close to the debris to be collected. As in the previous case an upward water flow is established within the main tube 14 upon air admission whereby the debris is sucked and discharged onto the glass wool 22 within the fluid inlet chamber 1.

While a preferred embodiment according to the invention has been illustrated and described it is understood that various modifications may be resorted to without departing from the spirit and scope of the appended claims.

I claim:

1. An aquarium aerator and filter comprising in combination, a filter chamber having aligned top and bottom openings, a packing of filter material disposed within said filter chamber between said top and bottom openings, a fluid inlet chamber having an open top portion connected directly to said filter chamber bottom opening and a closed bottom portion having a central extension of tubular formation projecting upwardly from said bottom portion through said fluid inlet chamber to terminate within the lower portion of said filter chamber adjacent said filter packing so as to constitute a fluid passage from the exterior of said fluid inlet chamber to the interior of said filter chamber, said fluid inlet chamber including side walls extending upwardly from said bottom portion in spaced apart relationship from said central tubular extension and spaced apart openings in said side walls constituting fluid passages to the interior of said fluid inlet chamber, a straight elongated main tube having one end connected to the said top opening of said filter chamber with the other end of said tube being open for the discharge of aerated fluid, and an air pressure tube having one end connected into said main tube adjacent the end in connection with said filter chamber.

2. An aquarium aerator and filter as claimed in claim 1 wherein the top opening of said filter chamber is of circular outline and has a diameter substantially equal to the diameter of said main tube, the said bottom opening of said filter chamber also being of circular outline and of considerably greater diameter than said top opening, the open top portion of said fluid inlet chamber also being of circular outline and being of substantially equal diameter to said filter chamber bottom opening.

3. An aquarium aerator and filter as claimed in claim 1 wherein said filter chamber and said fluid inlet chamber are of circular formation in general cross section and said tubular extension is disposed concentrically of said chambers along the axes thereof the lower portion of said extension having an inside diameter substantially equal to the outside diameter of the end of said main tube connected to said filter chamber.

4. An aquarium aerator and filter as claimed in claim 1 wherein the bottom portion of said fluid inlet chamber extends beyond said chamber side walls to provide an outstanding flange.

References Cited in the file of this patent

UNITED STATES PATENTS

| Number | Name | Date |
|---|---|---|
| 2,275,428 | Haldeman | Mar. 10, 1942 |
| 2,491,853 | Feldman | Dec. 20, 1949 |
| 2,515,538 | Wall | July 18, 1950 |
| 2,533,936 | Holmes et al. | Dec. 12, 1950 |
| 2,614,529 | Hansen | Oct. 21, 1952 |